Sept. 15, 1970   A. R. COLLIER ET AL   3,528,884
SAFETY COOLING SYSTEM FOR A NUCLEAR REACTOR
Filed Sept. 28, 1967
2 Sheets-Sheet 1

United States Patent Office 3,528,884
Patented Sept. 15, 1970

3,528,884
SAFETY COOLING SYSTEM FOR A NUCLEAR REACTOR
Alan R. Collier, Pittsburgh, and Robert J. Creagan, Monroeville, Pa., assignors to Westinghouse Electric Corporation, Pittsburgh, Pa., a corporation of Pennsylvania
Filed Sept. 28, 1967, Ser. No. 676,987
Int. Cl. G21c 9/02
U.S. Cl. 176—37                                   4 Claims

ABSTRACT OF THE DISCLOSURE

An augmented emergency cooling system to eliminate the possibility of fuel clad melting in the core of a nuclear reactor is disclosed wherein a supply of water under pressure which may contain a neutron poison is automatically injected into the pressure vessel in the event of a loss-of-coolant accident. Check valves which are normally held in their closed position by the higher normal pressure in the nuclear reactor pressure vessel are opened reflexively to allow ingress of cooling fluid when a loss-of-coolant accident lowers the pressure in the fuel containing vessel. The coolant flow thereby produced maintains a safe temperature distribution until the standby water pumping systems can reach a fully operational condition.

BACKGROUND OF THE INVENTION

This invention pertains to nuclear reactor cooling systems, and more particularly to the emergency cooling systems which are provided to maintain structural integrity in the event of a loss-of-coolant accident.

Emergency core cooling systems for nuclear reactors rely upon large standby water pumping systems to supply cooling water in the event that normal cooling is lost or decreased through a break in the reactor coolant system. The disadvantage of such a pumping system is the time delay in establishing a sufficient coolant flow through the core while the system is being brought from its normal inactive state to a state of full operational capability. Recent advances in thermal-hydraulic technology have led to the conclusion that fuel or clad melting might occur due to this delay under certain severe accident conditions. moreover, overheating of the fuel cladding can result in a severe chemical reaction with its environment which may not be reversed by later cooling procedures.

Other prior art systems such as spray nozzles or deluge cooling connections above the reactor vessel also place much reliance upon fast actuation. Safety evaluations on such systems indicate that they are intolerant of failures of sensing, actuating, and power systems to meet expected performance.

It is desirable therefore to provide an emergency coolant system which achieves a substantially instantaneous inundation of the reactor core rather than permitting excessive core heating during the time it takes to actuate electrically operable pumping systems. Such a system should be extremely tolerant of failures to meet an exacting set or sequence of conditions, and still provide rapid flooding of the reactor core.

SUMMARY OF THE INVENTION

The aforementioned deficiencies existing in prior art systems are remedied by augmenting a modest capacity emergency pumping system with a highly reliable supply of water under pressure which is quickly reflexively injected into the nuclear core upon a drop of pressure in the pressure vessel due to a loss-of-coolant accident.

Water is stored in accumulator tanks under a gas pressure of a magnitude less than that normally existing in the reactor pressure vessel and its primary coolant system. The water is isolated from the reactor during normal operation with check valves. A loss-of-coolant accident has as a primary characteristic a drop in the pressure in the primary system. Such a drop in pressure causes the check valves to open and causes the pressurized accumulated water to immediately enter the reactor. Thus, the coolant flow is restored without reliance on instrumentation, pumps, valve operators, or other such means.

The initial cooling of the ful from the pressurized accumulator is followed by water at atmospheric pressure pumped from larger storage tanks.

The primary advantages resulting from such an addition to the usual emergency cooling system more than compensate for the cost of this addition. The emergency pumping and power systems can be of a reduced capacity. The containment structure may be of a reduced complexity, thickness, and cost since the range of possible accidents is appreciably reduced. The delays in emergency pumping that can be tolerated are increased which may reduce the cost of sensing and actuating systems for the emergency pumps. And, chemical reactions between the fuel clad and its environment are inhibited.

DESCRIPTION OF THE DRAWINGS

For a better understanding of the invention reference should be had to the accompanying drawings, in which.

DESCRIPTION OF THE PREFERRED EMBODIMENT

Figure 2:
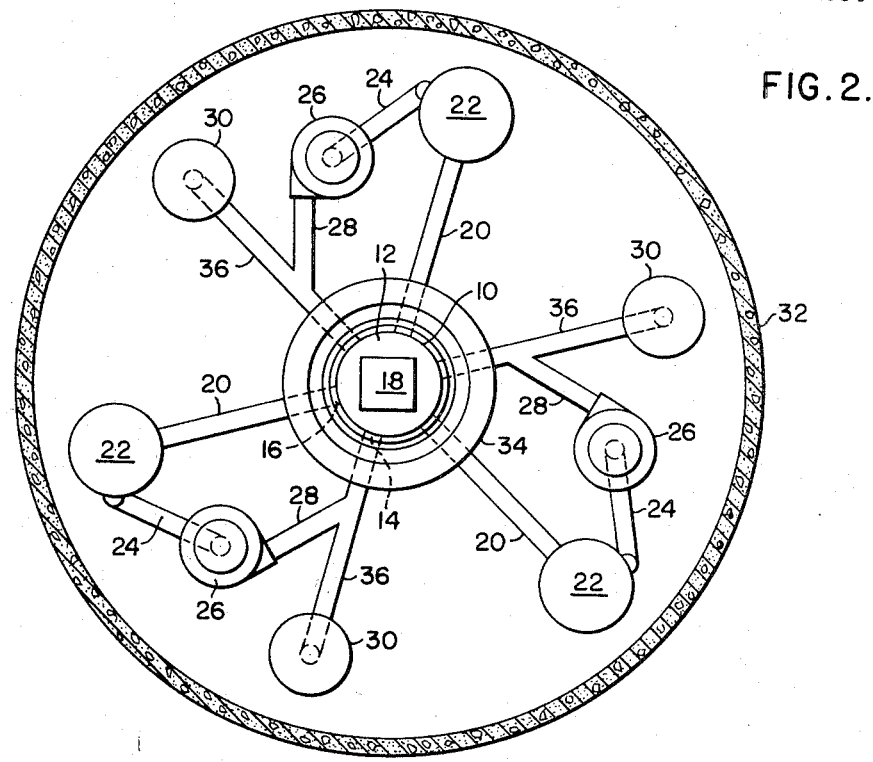
FIG. 2 is a top view taken along line II—II of FIG. 1.
Figure 1:
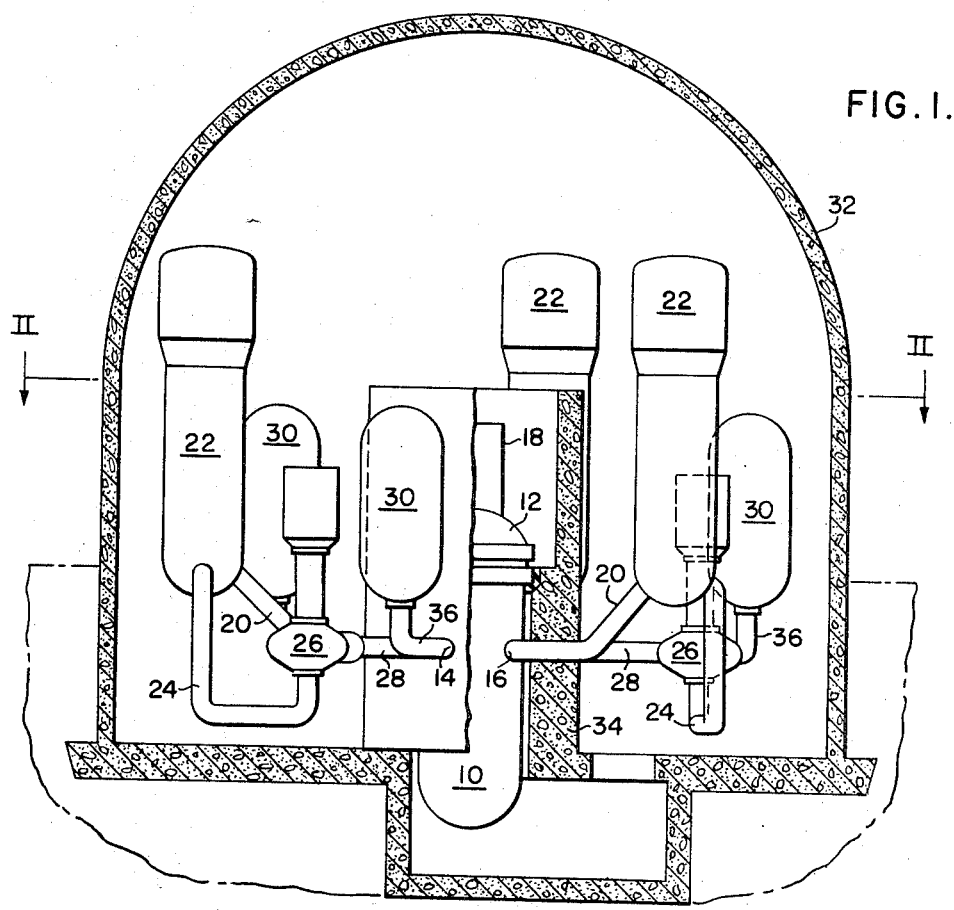
FIG. 1 shows a side view, partially in section, of the steam generating system according to this invention.

Referring now to FIGS. 1 and 2, there is illustrated a nuclear steam generating system of the pressurized water type incorporating the augmented emergency cooling system of this invention. A pressure vessel 10 is shown which forms a pressurized container when sealed by its head assembly 12. The vessel 10 has coolant flow inlet means 14 and coolant flow outlet means 16 formed integral with and through its cylindrical walls. As is known in the art, the vessel 10 contains a nuclear core (not shown) which generates substantial amounts of heat depending primarily upon the posiiton of a control means; the pressure housing 18 of which only is shown. The heat generated by the reactor core is conveyed from the core by the coolant flow entering through inlet means 14 and exiting through outlet means 16. After operation at power is achieved, the loss of such a coolant flow or other heat dissipating means would quickly melt the core structure.

The flow exiting through outlet means 16 is conveyed through hot leg conduit 20 to a heat exchange steam generator 22. The steam generator 22 is of a type wherein the heated coolant flow is conveyed through tubes (not shown) which are in heat exchange relationship with the water which is utilized to produce steam. The steam produced by generator 22 is commonly utilized to drive a turbine (not shown) for the production of electricity. The flow is conveyed from the steam generator 22 through conduit 24 to a pump 26 from which it proceeds through cold leg conduit 28 to inlet means 14. Thus, it can be seen that a closed recycling primary or steam generating loop is formed with the vessel 10, the steam generator 22, and the pump 26. The generating system illustrated has three such closed fluid flow systems or loops. The number of such system should be understood to vary from plant to plant, but currently two, three, or four are employed.

In the event of a break in one of the closed primary or steam generating systems, the capacity of all the primary systems to dissipate the heat produced by the nuclear core might be susbtantially impaired possibly resulting in a melt-down of the core structure and the release of dangerous fission products. Various safety systems are provided for this contingency which will be explained in detail with regard to the description of FIG. 3. According to this invention, an accumulator tank 30 is situated within the reactor containment structure 32 adjacent but ouside of he reactor missile barrier 34. The accumulator tank 30 is placed close to the cold leg conduit 28 and the pump 26 such that it may feed replacement fluid through a safety conduit 36 into the cold leg conduit 28.

Figure 3:
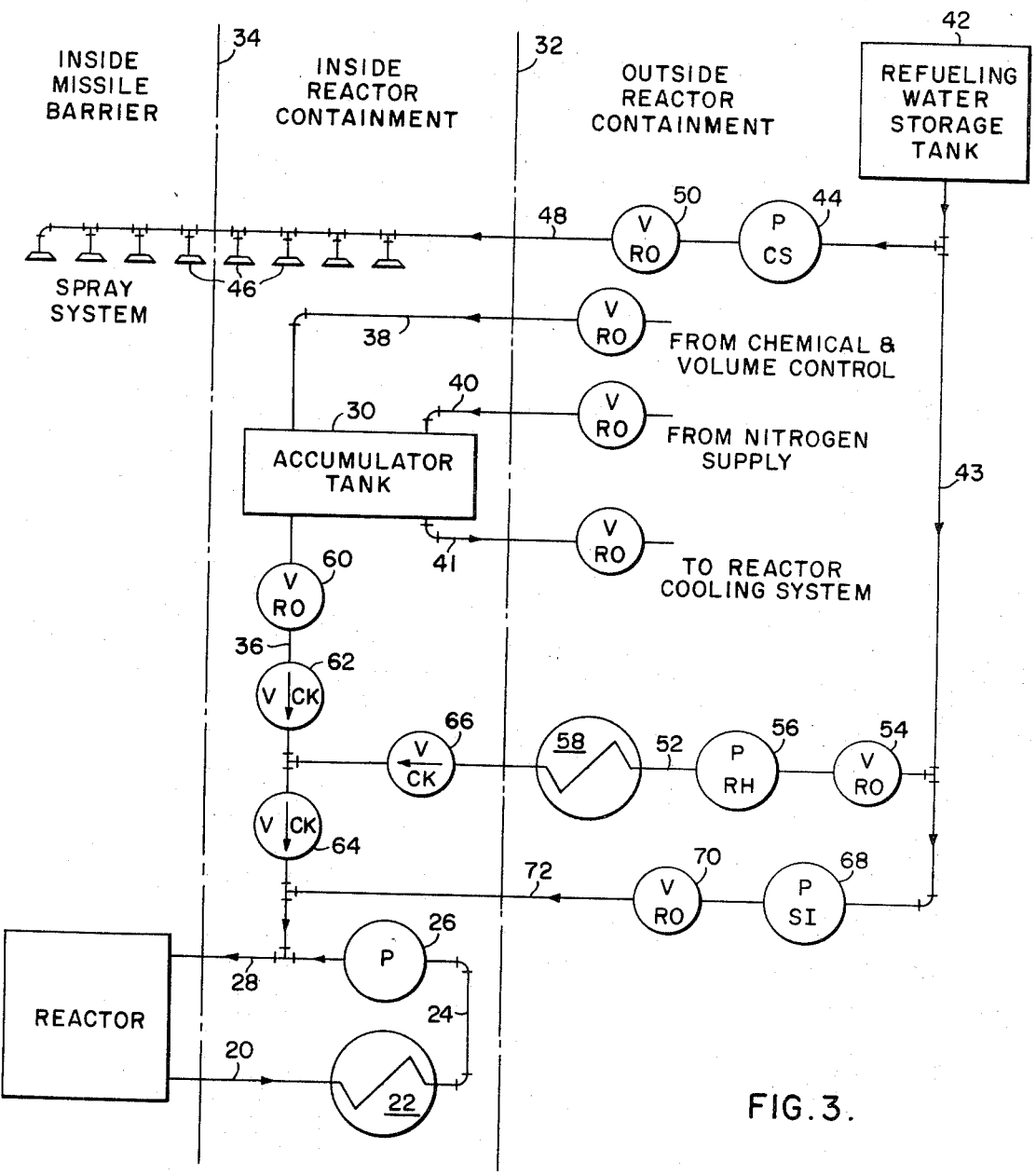
FIG. 3 shows simplified flow diagram of one loop of the safety circuit.

As can best be seen in FIG. 3, the accumulator tank 30 is supplied with a fluid such as borated water from a chemical and volume control system (not shown) through supply conduit 38, and is pressurized by a suitable gas, such as nitrogen through a pressurizer conduit 40. The amount of pressure utilized must be below that normally existing in pressure vessel 10 and above that which would exist in pressure vessel 10 in the event of severance in any of the primary conduits. For purposes of explanation, 600 p.s.i. will be assumed to be achieved through nitrogen pumping. The amount of borated water in the three accumulator tanks 30, i.e., the sizing of the tanks 30, is chosen by assuming that a break in any of the loops will spill the entire contents of the accumulator tank 30 associated with that loop through the break. The tanks 30 on the remaining loops must contain sufficient borated water to fill the pressure vessel 10 to a level such that a substantial part of the nuclear core is covered. The accumulator tank 30 also has a drain line 41 as well as gas vents (not shown).

The system associated with the accumulator tanks 30 is, as indicated, the fastest responding of the three safety systems shown in FIG. 3 since the energy needed to drive same has already been stored in tank 30. Other of the safety systems comprise a refuling water storage tank 42 which supplies water through a storage supply line 43 to a reactor containment spray circuit, a makeup water circuit, and a safety injection circuit.

The containment spray system essentially comprises containment chemical spray pumps (PCS) 44 to supply water under pressure to spray heads 46 through conduits 48 when remotely actuated valves (VRO) 50 are opened, as dictated by emergency conditions.

The makeup water system and the safety injection system feed water in the cold leg conduit 28 through a header in the safety conduit 36 through which the accumulator tanks 30 are also connected to the cold leg conduit 28. The makeup water system is rendered operative to compensate for small losses generally due to leakage in valves and other coupling members. As can be seen, the makeup water line 52 has remotely actuated valves (VRD) 54 which governs the operation of the system, residual heat pumps (PRH) 56, and heat exchangers 58.

If a break should occur in a primary loop, the pressure in the vessel 10 would drop substantially. Any severance necessitating reflexive injection from the accumulation tank 30 would cause the pressure to drop below 600 p.s.i. which, it may be recalled, is the pressure existing in the accumulator tank 30 in this example. Remotely actuated valves (VRO) 60 on the safety conduits 36 are in their open position during normal operation, i.e., once the vessel 10 has exceeded, say, 800 p.s.i. after start-up valves 60 are opened and generally left in the open position. The higher normal pressure in the vessel 10 also closes the check valves (VCK) 62 and 64 in the safety line 36 and check valve (VCK) 66 in the makeup water line 52. Therefore, a loss of pressure resulting from a loss of coolant accident would immediately open the check valves (VCK) 62 and 64 in the safety line 36 due to the higher pressure in the accumulator tank 30. This automatic reflex action would result in the substantially immediate dumping of the borated water from the accumulator tanks 30 into the vessel 10 through the safety conduit 36 and the cold leg conduit 28. The check valve (VCK) 66 would remain closed as long as the pressure on its downstream side was higher, i.e., during safety injection operations.

A loss-of-coolant accident when sensed also starts safety injection pumps 68 and opens remotely actuated valves (VRO) 70 on injection conduits 72 to feed water from the refueling tank 42 into the safety conduit 36. Normally, this last mentioned sequence, i.e., sensing a break, acuating the pumps 68, and opening the valves 70, as well as bringing the pumps 68 to full operational capability would be extremely intolerant of any delays. Moreover, even perfect operation could not assure the integrity of core structure if the break were sufficiently serious. Calculations with regard to a complete severance of a loop project melting even where the safety injection pumps and their actuation systems work perfectly. Further, irreversible chemical reactions of the fuel cladding and its environment may take place during the time delay in getting the pumps to full capacity operation. According to this invention, however, inasmuch as borated water substantially immediately begins to flow through safety conduit 36, the safety pumping operation becomes more tolerant of delays and the safety injection pumps (PSI) 68 may be of substantially reduced capability.

It should also be mentioned that remotely operated valve (VRO) 60 could be closed if leaking occurs in the check valves (VCK) 62 or 64. The signal which starts the safety injection pumps 68 (PSI) would then also be used to open this valve should it be closed at the time of an accident.

The accumulator tank 30 is fitted with means for sampling its boron concentration (not shown) as well as periodically checking its fluid level (not shown). Test circuits may also be provided for checking the various valves.

The new and improved safety injection circuit herein described including the reflex system utilizing fluid under pressure is at present considered to be the preferred embodiment of the invention. Modifications will readily occur to those skilled in the art. In particular, various well known system interconnections between the pumping systems would result in increased reliability of the entire system. It is not desired, therefore, that the invention be limited to the specific arrangements shown and described, but rather the true spirit and scope of the invention is intended to be delineated in the appended claims.

What is claimed is:

1. A nuclear reactor system comprising, in combination, a containment structure, a pressurized reactor vessel within said containment structure and having a nuclear core therein, coolant flow inlet openings and outlet openings in said pressurized reactor vessel, at least one closed fluid circulating loop coupled to said inlet openings and said outlet openings, an emergency coolant pumping system flow-coupled to said reactor vessel including a water container and a pump coupled at its upstream side to said water container and at its downstream side to said reactor vessel, a tank having a supply of coolant fluid therein, means for supplying a substantial gas pressure to said tank to pressurize said tank to a level less than that of said pressurized reactor vessel during normal operations, a conduit flow-coupling said tank to said reactor vessel, and at least one check valve situated within said conduit, said check valve being normally closed by the higher pressure within the reactor vessel and reflexively opened only when the pressure within the vessel falls below the pressure within said tank.

2. The nuclear reactor system of claim 1 wherein the tank is situated within the containment structure proximate the reactor vessel.

3. The nuclear reactor system of claim 2 wherein said coupling conduit connects said tank to said loop proximate said inlet opening.

4. A process for inundating the core of a nuclear reactor in the event of a loss-of-coolant accident comprising:
  (a) storing a first quantity of coolant under a pressure lower than that within the nuclear reactor vessel adjacent said reactor vessel,
  (b) storing a second and larger quantity of coolant outside the reactor containment structure,
  (c) reflexively injecting said first quantity of coolant into the reactor vessel immediately upon the occurrence of a loss-of-coolant accident by way of a check valve which is normally held closed by the higher pressure within the reactor vessel,
  (d) concurrently initiating pumping from said second quantity of coolant so as to continue the refilling of the reactor vessel.

References Cited

FOREIGN PATENTS

| 887,252 | 2/1962 | Great Britain. |
| 1,086,060 | 4/1967 | Great Britain. |
| 1,148,665 | 11/1966 | Germany. |
| 1,417,483 | 11/1964 | France. |

OTHER REFERENCES

Proceedings of the Third International Conference on the Peaceful Uses of Atomic Energy, held in Geneva, Aug. 31–Sept. 9, 1964, vol. 13, Nuclear Safety, United Nations, N.Y. 1965, pp. 362–369.

REUBEN EPSTEIN, Primary Examiner

U.S. Cl. X.R.

176—38, 65